(12) United States Patent
Roy et al.

(10) Patent No.: US 10,146,478 B1
(45) Date of Patent: Dec. 4, 2018

(54) PROVIDING CONCURRENT ACCESS TO SHARED COMPUTING RESOURCES BY INTERLEAVING COMMANDS AND MAINTAINING A CONSISTENT OBJECT STATE

(71) Applicant: EMC IP Holding Company LLC, Hopkinton, MA (US)

(72) Inventors: Amitava Roy, Lexington, MA (US); Norman Speciner, Medway, MA (US); Rajesh Kumar Gandhi, Shrewsbury, MA (US); Hongxin Zhang, Hopkinton, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 15/662,414

(22) Filed: Jul. 28, 2017

(51) Int. Cl.
  *G06F 13/10* (2006.01)
  *G06F 3/06* (2006.01)

(52) U.S. Cl.
  CPC .......... *G06F 3/0659* (2013.01); *G06F 3/0619* (2013.01); *G06F 3/0673* (2013.01)

(58) Field of Classification Search
  CPC ..... G06F 3/0659; G06F 3/0673; G06F 3/0619
  USPC ........................................................ 711/150
  See application file for complete search history.

(56) References Cited

U.S. PATENT DOCUMENTS

| | | |
|---|---|---|
| 7,254,685 B1 | 8/2007 | Cardente |
| 8,447,782 B1 | 5/2013 | Vipul et al. |
| 8,856,079 B1 | 10/2014 | Subramanian et al. |
| 9,280,578 B1 | 3/2016 | Zhou et al. |
| 9,652,434 B1 | 5/2017 | Chen et al. |
| 9,864,691 B1 | 1/2018 | Chen et al. |
| 2003/0005229 A1* | 1/2003 | Rangan ............... G06F 12/0857 711/122 |

OTHER PUBLICATIONS

Wikipedia, "UML state machine," downloaded from <https://en.wikipedia.org/wiki/UML_state_machine on Jul. 11, 2017>, 15 pages.
Amit Roy, et al.; "Dynamic Management of Concurrent Access to Shared Computing Resources," U.S. Appl. No. 15/662,614, filed Jul. 28, 2017.
Amit Roy, et al.; "Automatic Fault Tolerance in a Computing System Providing Concurrent Access to Shared Computing Resource Objects," U.S. Appl. No. 15/662,971, filed Jul. 28, 2017.

(Continued)

*Primary Examiner* — Jae U Yu

(74) *Attorney, Agent, or Firm* — BainwoodHuang

(57) ABSTRACT

Techniques are disclosed for managing access to shared computing resources in a computing system which include representing resources as objects and managing access to those objects using the construct of a resource instance manager. A set of resource instance managers respond to all commands requesting access to a set of respective shared resources. Access to each shared resource is managed by a unique resource instance manager for that resource which maintains a consistent state for that shared resource. When commands are designed according to an appropriate model and processed by a set of resource instance managers disclosed herein, multiple processes may execute in parallel without causing deadlocks or introducing data corruption.

17 Claims, 14 Drawing Sheets

(56) References Cited

OTHER PUBLICATIONS

Binhua Lu, et al.; "Data Storage System With Active-Standby System Management," U.S. Appl. No. 15/279,496, filed Sep. 29, 2016.
Gyanesh Kumar Choudhary, et al.; "Techniques for Efficiently Performing Filesystem Reorganization Tasks for Different Filesytems," U.S. Appl. No. 15/394,601, filed Dec. 29, 2016.
Philippe Armangau, et al.; "Adaptive Thread Processing of 10 Requests," U.S. Appl. No. 15/086,647, filed Mar. 31, 2016.

* cited by examiner

PROVIDING CONCURRENT ACCESS TO SHARED COMPUTING RESOURCES BY INTERLEAVING COMMANDS AND MAINTAINING A CONSISTENT OBJECT STATE

BACKGROUND

Modern computing systems manage access to shared resources (e.g., memory, disk storage, file systems, files, logical units of storage, etc.) on behalf of users and various internal and external functions. However, not all resources are easily shared. For instance, if two processes attempt to modify the same file simultaneously, the contents of the file may become corrupted. Such concurrency problems can be addressed by allowing the computing system to execute only one process at any given time. However, doing so would result in underutilizing the processing capacity of the system, resulting in poor performance.

Conventional solutions to this problem allow the computing system to execute multiple independent processes ("threads") while preventing more than one process from modifying any one resource at any given time by using resource locks. In response to a resource access request made by a first thread, the system can "lock" a resource such that only that thread can modify or otherwise access the resource at any given time. Other threads which do not require access to that locked resource can proceed uninterrupted.

SUMMARY

Unfortunately, conventional approaches using resource locks have deficiencies. Using resource locks requires each thread that accesses various shared resources to be aware of whether access to the resource is controlled and to negotiate access to those resources as needed. If access to a resource is controlled, a thread must request exclusive access to that resource and maintain exclusive access until the thread has finished accessing the resource. Frequently, a thread or process that requires a long time to complete execution will maintain exclusive access to the resource for the entire execution period, thereby delaying other tasks, resulting in poor overall system performance. In other cases, a poorly-designed thread may fail to release the lock in a timely fashion under certain circumstances. In still other cases, each of two or more processes may lock resources required by the other processes. For example, a first thread and a second thread may both require access to resource 'A' and resource 'B.' If the first thread locks resource 'A' and the second thread locks resource 'B,' neither thread will be able to execute, resulting in a deadlock that prevents one or more commands from executing indefinitely. In addition, threads waiting for access to a locked resource continue to consume system resources while repeatedly checking whether the lock has been released. Implementing such processes requires significant effort on the part of developers who must write code that accomplishes a desired function, while also correctly handling access restrictions without causing command processing deadlocks.

In contrast with prior approaches, improved techniques for managing access to a set of shared computing resources in a computing system include representing resources as objects and managing access to those objects using a set of resource instance managers. Access to each shared resource is managed by a unique resource instance manager for that resource. When commands are designed appropriately and processed by a set of resource instance managers as disclosed herein, multiple processes may execute in parallel without causing deadlocks and or introducing data corruption.

Each resource instance manager receives subcommands of various commands and enqueues them in an event queue. Each resource instance manager then allows one subcommand to run at a time, while maintaining a consistent object state for the shared resource which that particular resource instance manager corresponds to. When a subcommand modifies the object state of the shared resource, the resource instance manager communicates changes in that object state to the next subcommand in the queue before allowing that subcommand to execute.

These improved techniques allow multiple processes to run simultaneously while safely sharing access to shared computing resources. However, in contrast to conventional approaches, they do not require those processes to directly manage access to the various shared resources. In addition, such improved techniques allow a computing system to operate more efficiently by dramatically reducing the number of active threads which must be maintained in the working memory of the system under heavy usage conditions. Only a small number of threads, corresponding to the number of resource instance managers (and even fewer than that number if desired) is required to manage the shared resources being accessed at any given time, resulting in reduced memory and processor overhead and improved system performance.

Certain embodiments are directed to a method of preventing command processing deadlocks and maintaining a consistent object state for each of a set of shared computing resource objects (hereinafter "shared resources" or "resources") in a computing system which executes a set of commands having subcommands for managing the shared resources. The method includes creating, in memory of the computing system, a set of resource instance managers for a set of respective shared resources, each resource instance manager configured to process subcommands acting on the respective shared resource for that resource instance manager.

The method further includes receiving and enqueuing each subcommand in an event queue of one of the resource instance managers according to a respective shared resource that subcommand acts upon.

The method further includes processing enqueued subcommands of each resource instance manager by that resource instance manager. Each resource instance manager executes, during a first time interval, a subcommand belonging to a particular command, the subcommand acting on the respective shared resource for that resource instance manager, to the exclusion of executing any other subcommand that acts on the respective shared resource.

Each resource instance manager, in response to executing the subcommand, updates the consistent state for the respective shared resource to an updated resource state for the respective shared resource, the updated resource state for the respective shared resource resulting from the subcommand acting on the respective shared resource.

After updating the consistent object state for the respective shared resource, each resource instance manager executes, during a second time interval different from the first time interval, another subcommand belonging to another command, to the exclusion of executing any other subcommand that acts on the respective shared resource and updates the consistent state of the respective shared resource in response to executing the other subcommand. Other embodiments are directed to a computer program product, an apparatus, and a system configured to perform similar methods.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

Improved techniques for managing access to a set of shared computing resources in a computing system include representing resources as objects and managing access to those objects using a set of resource instance managers. The set of resource instance managers respond to all commands requesting access to the set of respective shared resources. Access to each shared resource is managed by a unique resource instance manager for that resource. When the commands are processed by the set of resource instance managers as disclosed herein, multiple processes may execute in parallel without causing deadlocks or corrupting the object state of a resource object. Each resource instance manager receives subcommands of the various commands and enqueues them in an event queue. Each resource instance manager then allows one subcommand to run at a time, while maintaining a consistent object state for the shared resource corresponding to that resource instance manager. When execution of a subcommand modifies the object state of the shared resource, the resource instance manager updates that object state and communicates changes in that object state to the next subcommand in the queue before allowing that subcommand to be executed.

The terms "shared resource object", "resource object", "shared resource", and "resource" are used interchangeably herein to mean a shared resource of a computing system which may be represented as a software object. At different locations, one term or another may be used to emphasize particular aspects of the disclosure.

Figure 1:
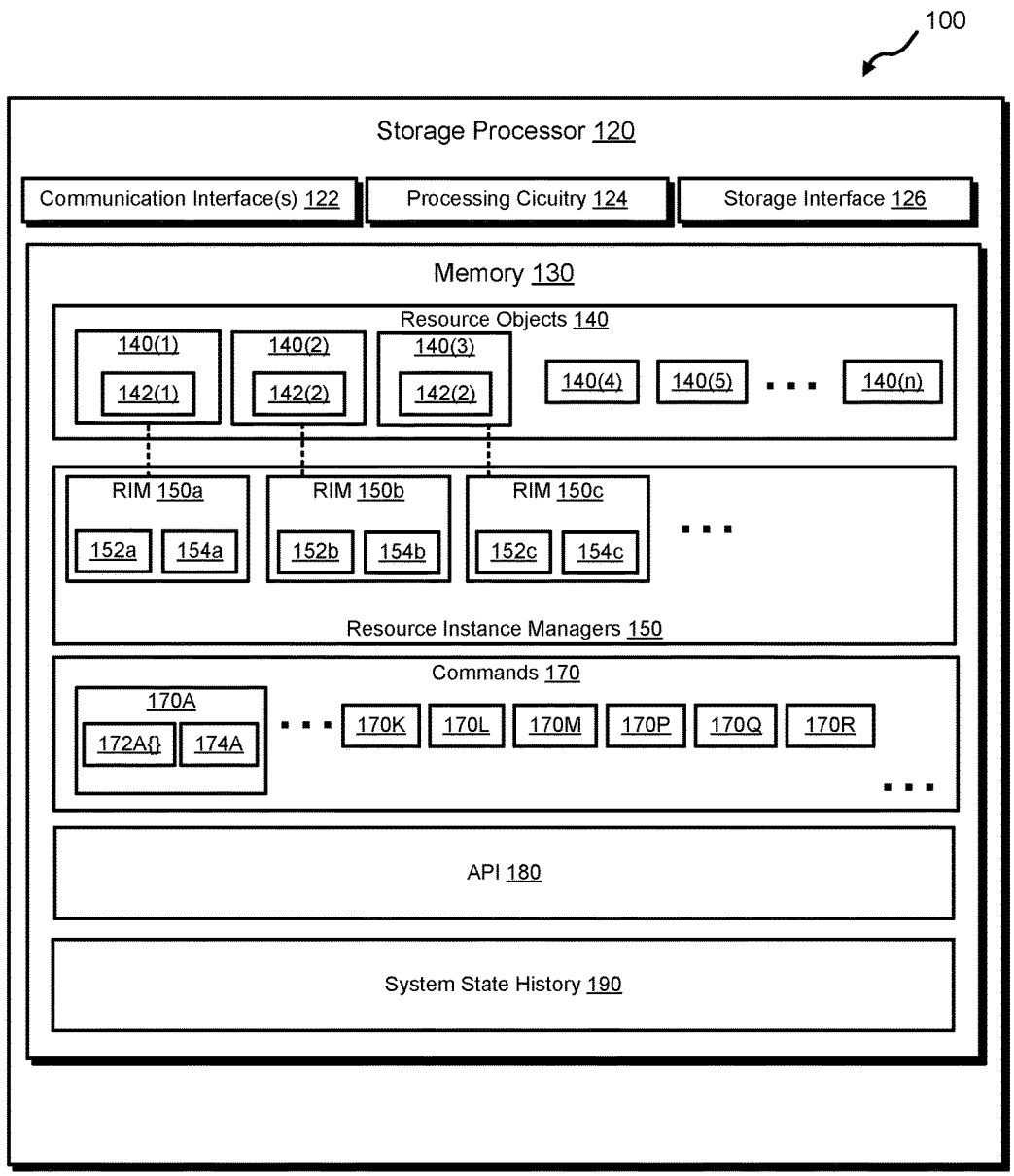
FIG. 1 is a block diagram of an example computing system for use in connection with various embodiments.

FIG. 1 shows an example environment 100 in which embodiments of the improved technique hereof may be practiced. Environment 100 includes a computing system, such as, for example, storage processor 120 which may be part of a data storage system (not shown). Example data storage systems may include, for example, VNX, VNXe, or VMAX data storage appliances manufactured by Dell EMC of Hopkinton, Mass. Data storage systems (not depicted) are arrangements of hardware and software that typically include multiple storage processors 120 coupled to arrays of non-volatile data storage devices (not depicted), such as magnetic disk drives, electronic flash drives, and/or optical drives. The storage processors 120 service host I/O operations (not depicted) received from host machines (not depicted). The received I/O operations specify storage objects (e.g. logical disks or "LUNs") that are to be written to, read from, created, or deleted. The storage processors 120 run software that manages incoming I/O operations and that performs various data processing tasks to organize and secure the host data received from the host machines and stored on the non-volatile data storage devices.

The storage processor 120 includes communication interface circuitry 122, processing circuitry 124, storage interface circuitry 126, and memory 130. In some example embodiments, there may be multiple storage processors 120 that work together.

The communications interface circuitry 122 may include one or more Ethernet cards, cellular modems, Fibre Channel (FC) adapters, Wireless Fidelity (Wi-Fi) wireless networking adapters, and/or other devices for connecting to a network. Processing circuitry 124 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

The storage interface 126 may be used to interface with various physical storage devices (not depicted), such as hard disk drives, flash memory, and so on using any kinds of buses and protocols suitable for communication with storage devices (e.g., SCSI, FC, etc.).

Memory 130 may be any kind of digital system memory, such as, for example, random access memory (RAM). Memory 130 stores one or more operating systems (OSes) in operation (e.g., Linux, UNIX, Windows, MacOS, or a similar operating system; not depicted) and various applications (not depicted) configured to execute on processing circuitry 124. In some embodiments, memory 130 may also include a persistent storage portion (not depicted). The persistent storage portion of memory 130 may be made up of one or more persistent storage devices, such as, for example, disks. The persistent storage portion of memory 130 is configured to store programs and data even while the storage processor 120 (or other computing system) is powered off. The OS and the applications are typically stored in this persistent storage portion of memory so that they may be loaded into a system portion of memory 130 from this persistent storage portion of memory 130 upon a system restart. The processing circuitry 124 running one or more of these programs (e.g., one of the set of resource instance managers 150 or one of the set of commands 170, to be described further herein) thus forms a specialized circuit constructed and arranged to carry out the various processes described herein.

Memory 130 is depicted storing resource objects 140, which includes individual resources 140(1)-140(n). A resource object 140 may be any computing object that may be managed by a computing system. Examples of resource objects ("resources") may include extents of virtual or physical storage (e.g., physical disk storage volumes, logical storage volumes, also known as "LUNs," pools of disk extents aggregated from multiple physical storage drives, "slices" of storage provided by such disk extents, etc.), computing processes, user interface elements, and other types of resources. As a specific example, a long-running process, such as migrating the contents of one LUN to a new location may be managed as a shared resource, allowing other processes to modify the status of that process. Each resource 140 has a respective object state 142 (e.g., object state 142(1) belonging to resource 140(1), object state 142(2) belonging to resource 140(2), and so on).

Memory 130 stores resource instance managers 150a, 150b, 150c, . . . (collectively, resource instance managers 150), described further herein. It should be appreciated that FIG. 1 is an example and that a computing system such as storage processor 120 may have any number of resource instance managers 150. Memory 130 also stores commands 170 (depicted as commands 170A, . . . , 170K, 170L, 170M, 170P, 170Q, 170R, . . . ), also described further herein. Memory 130 also stores system state history 190, described further in connection with FIGS. 5A and 5B, for example, and elsewhere herein. Commands 170 may make use of functions supplied by the system as part of application program interface (API) 180, also stored in memory 130, as described further herein, particularly in connection to FIGS. 5A-5B.

Processing circuitry 124 handles instructions, including internal requests acting on resources 140 and requests acting on resources 140 received via the communication interface 122. Processing these instructions may result in modifying the state 142 of a resource object 140, and/or the execution status of a command 170, a history of those changes being collectively stored as part of system state history 190. Processing circuitry 124 responds to these requests by using the set of resource instance managers ("RIMs") 150.

Each RIM 150 is configured to handle processes that access a particular one of the shared resources 140. For instance, as depicted in FIG. 1, RIM 150a is associated with resource 140(1), RIM 150b is associated with resource 140(2), RIM 150c is associated with resource 140(3), and so on. Each RIM 150 has a respective event queue 154 which enqueues subcommands 172 of commands 170. Each RIM 150 also has a command queue 152, used to further manage the processes directed to that RIM 150, as described further herein in connection with FIGS. 7A-7C, for example.

As above, each command 170 generates subcommands 172 while that command 170 is being executed. Each command 170 also has associated command state data 174, which is used by the system during execution of that command 170, as described further herein, particularly in connection to FIGS. 5A-5B, for example.

It should be appreciated that, at any given time during operation of the storage processor 120, there may be fewer RIMs 150 in memory 130 than there are resources 140. A RIM 150 may be created in the memory 130 on an as-needed basis in response to a command 170 that requires access to one of the resources 140. This may be accomplished, for example, by loading object code for a general-purpose RIM 150 into memory 130, creating a particular instance of a RIM 150(x) in memory 130 and associating that RIM 150(x) with a particular resource 140(y). Along these lines, when a particular RIM 150(x) is not actively needed to process requests for its associated resource 140(y), that RIM 150(x) may be removed from memory 130 or otherwise deactivated so as not to unnecessarily consume memory or processing capacity of processing circuitry 124.

Figure 2A:
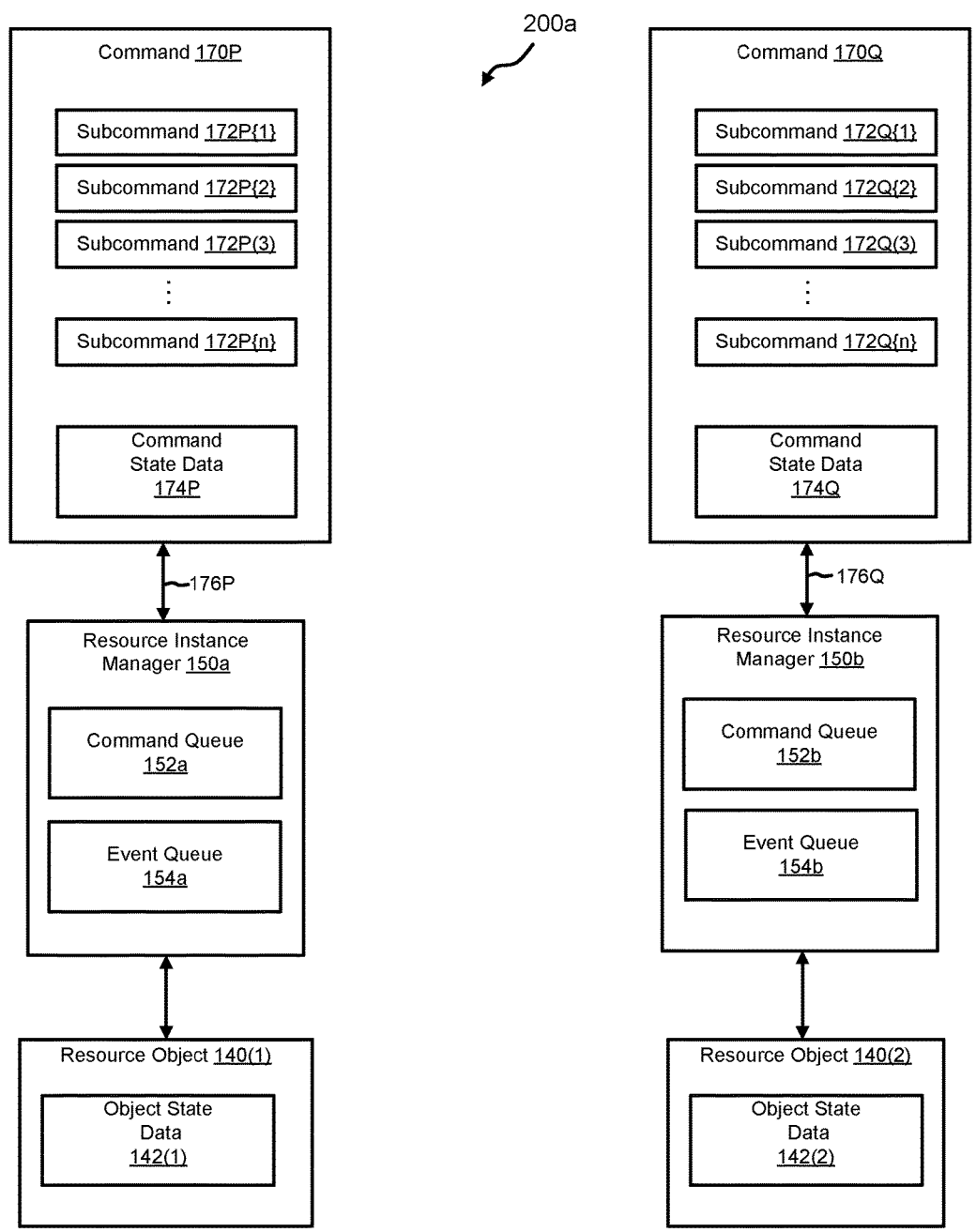
FIGS. 2A-2B are block diagrams of example arrangements of data structures for use in connection with various embodiments.

FIG. 2A depicts an example arrangement 200a of two commands 170P and 170Q during execution by processing circuitry 124. Each command 170 executes various subcommands 172 by transmitting and receiving a set of events 176 to and from appropriate RIMs 150. Each command 170 also maintains command state data 174 which may include a current status of the command 170 and values of variables internal to the command 170. For instance, command 170P is shown having subcommands 172P{1}-172P{n} and command state data 174P and transmitting/receiving events 176P. Similarly, command 170Q is shown having subcommands 172Q{1}-172Q{n} and command state data 174Q and transmitting/receiving events 176Q.

FIG. 2A also depicts RIM 150a, RIM 150b, resource 140(1), and resource 140(2). Each RIM 150 has a command queue 152 (depicted as command queues 152a and 152b) and an event queue 154 (depicted as event queues 154a and 154b).

At various times, each command 170 issues subcommands 172 that act upon various resources 140. In example arrangement 200a, all the subcommands of command 170P (subcommands 172P{1}-172P{n}) act upon resource 140(1), while all the subcommands of command 172Q (subcommands 172Q{1}-172Q{n}) act upon resource 140(2). Consequently, command 170P interacts with resource 140(1) through RIM 150a and command 170P interacts with resource 140(2) through a different RIM 150b. Command 170P interacts with RIM 150a by sending and receiving events 176P and command 170Q interacts with RIM 150b by sending and receiving events 176Q.

Figure 2B:
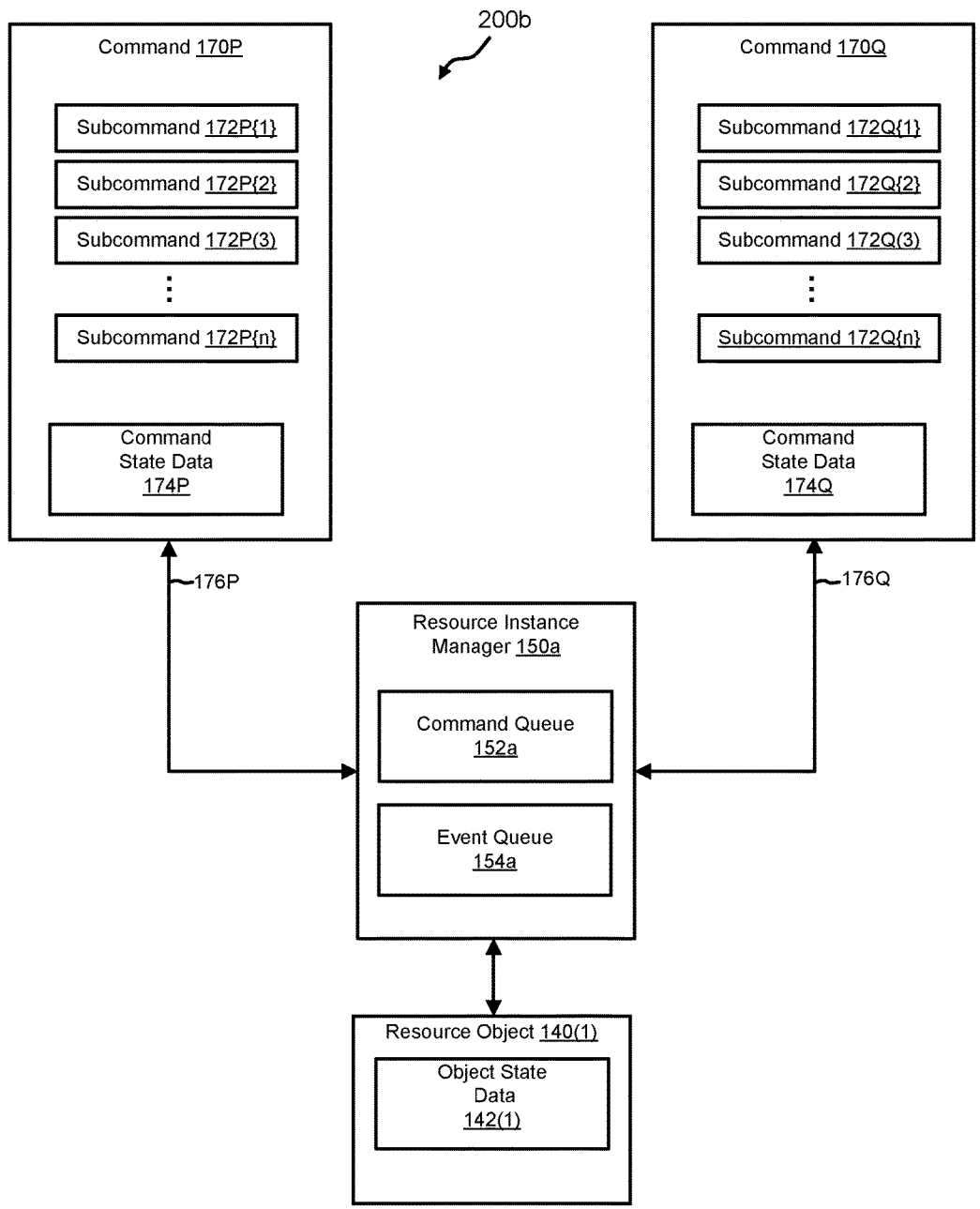

FIG. 2B shows a different example arrangement 200b of command 170P and command 170Q. In example arrangement 200b, two commands, 170P and 170Q, share resource 140(1). Consequently, both command 170P and command 170Q communicate with the single RIM 150a which responds to requests for resource 140(1).

In both example arrangement 200a and example arrangement 200b, RIM 150a manages execution of all subcommands 172 acting on resource 140(1). In addition, in example arrangement 200a, RIM 150b manages execution of those subcommands 172Q acting on resource 140(2). The RIMs 150 manage the resource state data 142 of each resource 140 (i.e., resource state data 142(1) and resource state data 142(2) of the respective resources, resource 140(1) and resource 140(2)). The RIMs 150 communicate the resource state data 142 of the respective resources 140 to the commands 170. After each subcommand 172 is executed, the appropriate RIM 150 updates the resource state data 142 for the respective resource 140 if the state of that resource object 140 has been altered. As described further in connection with FIGS. 3A-3B, the use of RIMs 150 disclosed herein allows for multiple processes (e.g., commands 170)

to access shared resources 140 while preventing command processing deadlocks and corruption of the states 142 of the shared resources 140.

Although not depicted in FIGS. 2A-2B, the subcommands 172 of a single command 170 may, taken together, act on more than one shared resource 140. For instance, a command 170M may have subcommand 172M{1} (not shown) which acts on shared resource 140(1) via RIM 150a and may also have subcommand 172M{2} which acts on shared resource 140(2) via RIM 150b.

Interleaving Subcommands

As above, a RIM 150 manages execution of subcommands 172 originating from commands 170. When more than one command 170 accesses a shared resource 140, the corresponding RIM 150 allows only subcommand 172 to act on the shared resource 140 at a given time. Commands 170 may communicate with RIMs 150 by sending messages ("events") requesting execution of particular subcommands 172.

It should be understood that, in this context, the word "subcommand" refers to a particular instance of a general subcommand class. For instance, a command 170 may, at different times, repeatedly execute identical operations. As a trivial example, a command 170 might issue multiple instances of an "addition" operation as subcommands 172. In the context of this disclosure, each operation would be referred to as a unique subcommand 172, having a unique reference number (e.g., two "addition" operations might be referred to as subcommand 172S{1}, not shown, and subcommand 172S{2}, respectively).

RIMs 150 enable multiple commands 170 to share access to particular shared resources 140. Upon receiving an event 176 requesting execution of a subcommand 172, a RIM 150 places the subcommand 172 in its respective event queue 154. Subsequent subcommands 172 are placed in the appropriate event queues 154 as well and are then executed one at a time per resource 140. The RIM 150 ensures that each subcommand 172 is provided with the current resource object state data 142 before execution.

It should be understood that, in some embodiments, the order of executing commands 170 may be controlled using command queues 152 of appropriate RIMs 150 before subcommands 172 are enqueued in event queues 154 of the RIMs 150. Features of the command queues 152 are discussed further herein, particularly in connection with FIGS. 7A-7C, for example.

Figure 3A:
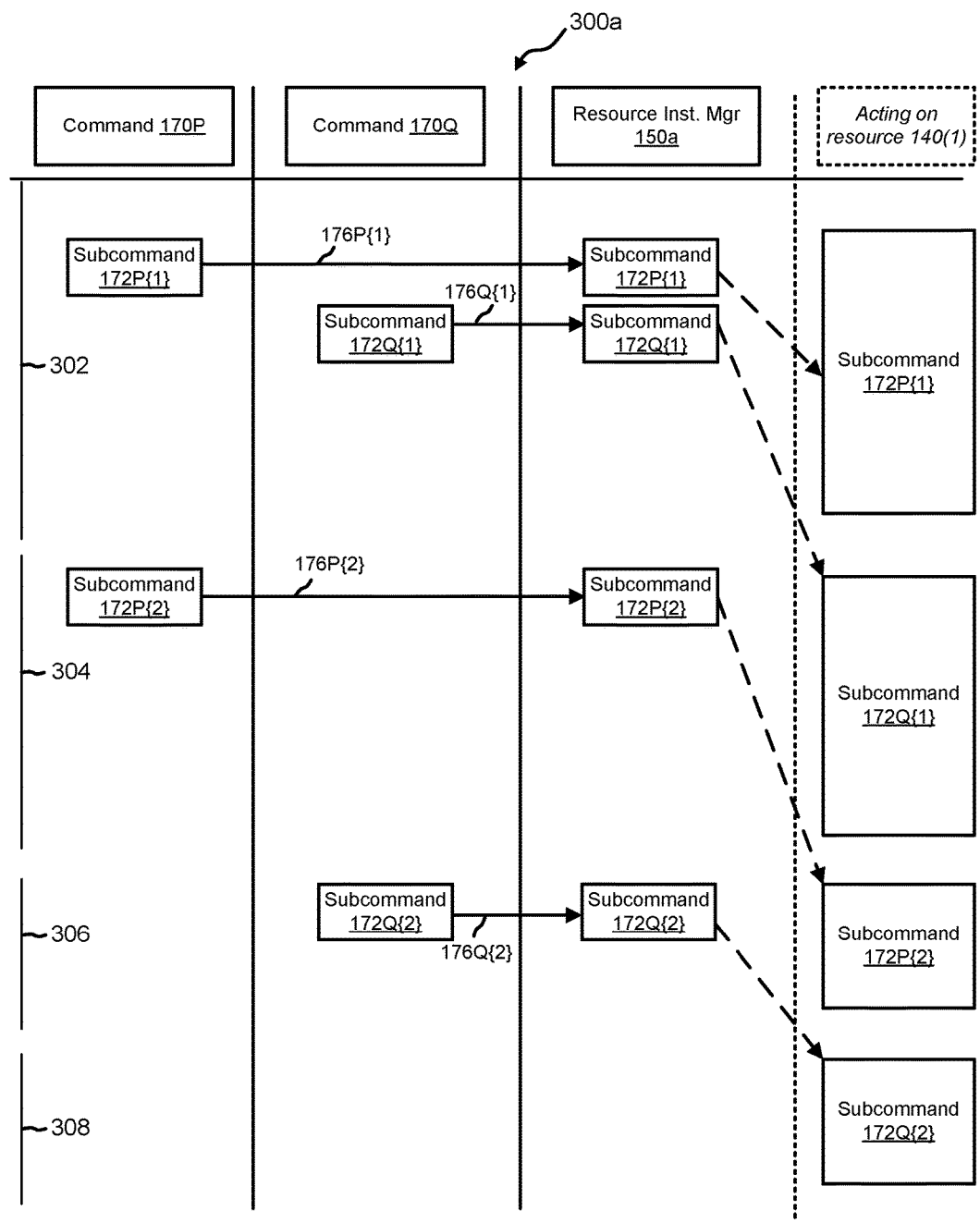
FIGS. 3A-3B show example sequences of operations for use in connection with various embodiments.

FIG. 3A shows an example sequence 300a of two commands, 170P and 170Q sharing resource 140(1), mediated by RIM 150a. For purposes of illustration, sequence 300a is divided into time intervals 302, 304, 306, and 308.

During interval 302, command 170P transmits subcommand 172P{1} to RIM 150a by issuing event 176P{1}. Because subcommand 172P{1} is the first subcommand 172 received by RIM 150a, it is executed immediately. After RIM 150a receives subcommand 172P{1} from command 170P, RIM 150a receives subcommand 172Q{1} from the command 170Q. Because subcommand 172Q{1} is received while subcommand 172P{1} is acting on resource 140(1), subcommand 172Q{1} waits in event queue 154a of RIM 150a until subcommand 172P{1} has completed execution.

At the end of interval 302, once subcommand 172P{1} has executed, subcommand 172P{2} of command 170P is enqueued in the event queue 154a of RIM 150a for execution during the next time interval 304.

During interval 304, the next queued subcommand 172 (i.e., subcommand 172Q{1}) is executed. RIM 150a continues to execute one subcommand 172 at a time during each of the remaining intervals (intervals 306 and 308).

At the beginning of the next interval of time 306, subcommand 172Q{2} of command 170Q is enqueued in event queue 154a of RIM 150a for execution.

During interval 306, the next queued subcommand 172 (subcommand 172P{2}) is executed. At the end of interval 306, once subcommand 172P{2} has executed, RIM 150a is ready to execute the next queued subcommand 172.

During interval 308, the next queued subcommand 172 (subcommand 172Q{2}) is executed. At the end of interval 306, once subcommand 172Q{2} has executed, RIM 150a has finished processing both command 170P and command 170Q.

Figure 3B:
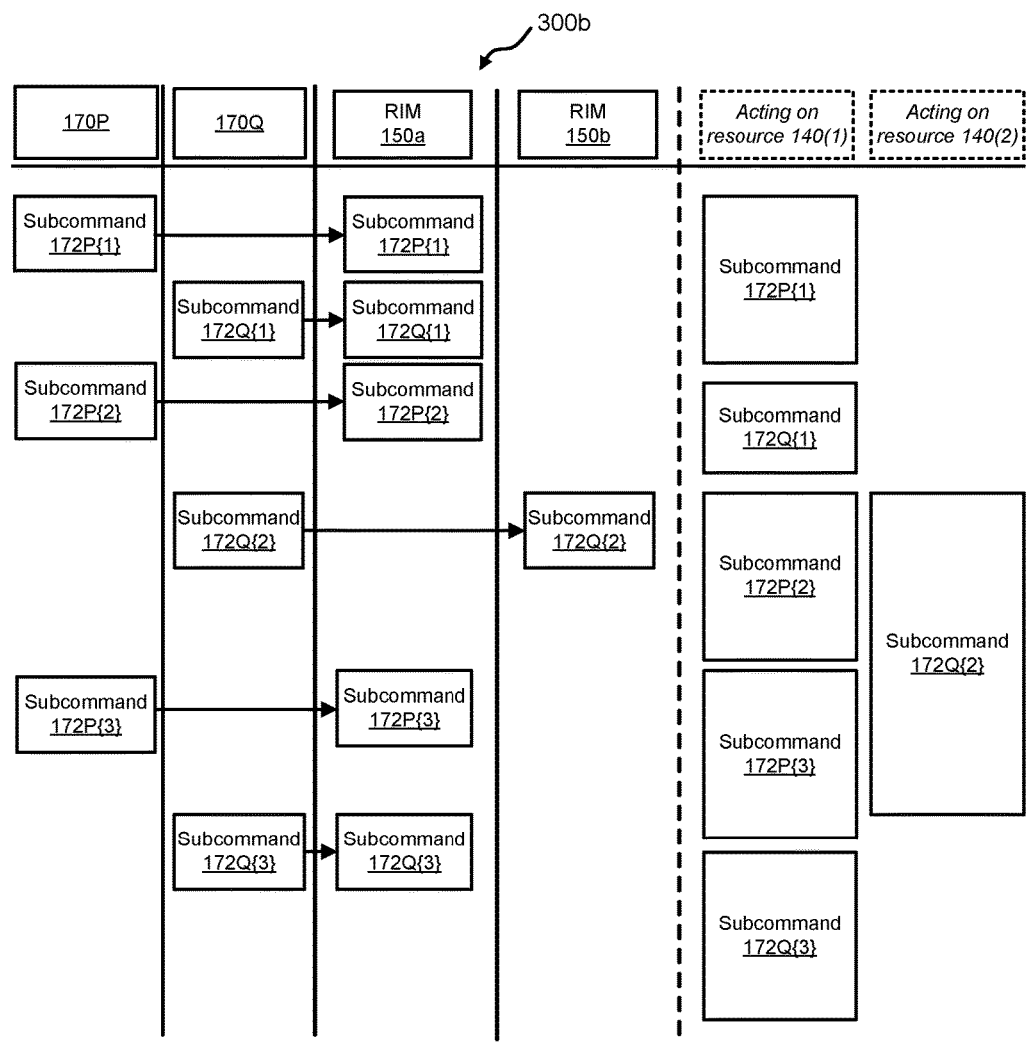

FIG. 3B shows example sequence 300b which illustrates a more complicated example execution sequence of commands 170P and 170Q. Events are depicted as arrows, as in FIG. 3A, but explicit labels and descriptions have been omitted to simplify the explanation. In example sequence 300b, commands 170P and 170Q share access to resource 140(1), as in example sequence 300a. However, in example sequence 300b, command 172Q accesses both resource 140(1) and resource 140(2). Accordingly, the sequence diagram of FIG. 3B depicts RIM 150a in addition to RIM 150b.

As in sequence 300a, sequence 300b begins with command 170P transmitting subcommand 172P{1}, acting on resource 140(1) to RIM 150a. Subcommand 172P{1} begins executing immediately. Subcommand 172Q{1}, received by RIM 150a while subcommand 172P{1} is still executing, is enqueued in event queue 154a (not shown) of RIM 150a and executes once subcommand 172P{1} has completed execution. Similarly, subcommand 172P{2} is received by RIM 150a while the previous subcommand 172Q{1} is still executing and is enqueued in event queue 154a for later execution.

While subcommand 172P{2} of command 170P is executing, command 170Q issues subcommand 172Q{2}. Unlike all previously described subcommands 172 in FIGS. 3A and 3B, subcommand 172Q{2} acts upon resource 140(2), rather than resource 140(1). Accordingly, subcommand 172Q{2} is received by RIM 150b rather than RIM 150a. Because subcommand 170Q{2} acts upon a different shared resource 140 than subcommand 170P{2}, the two subcommands 172P{2} and 170Q{2} are allowed to execute simultaneously, as depicted in sequence 300b.

Accordingly, as illustrated by FIGS. 3A and 3B, the methods disclosed herein allow for the execution of multiple simultaneous commands, while preventing conflicts and deadlocks by allowing only one subcommand to act on any particular shared resource 140 at a time. It should be appreciated that the improved techniques disclosed herein provide specific performance advantages over conventional approaches using resource locking ("locks"). For instance, because the RIMs 150 are responsible for coordinating access to the shared resources 140, the number of active threads in computing system 100 can be reduced dramatically when many commands 170 are running. As a result, it is not necessary to keep executing commands 170 in working memory (e.g., RAM) of processing circuitry 124 at all times. Accordingly, system memory requirements now scale according to how many shared resources 140 are being acted upon at one time rather than scaling with how many commands 170 are in process at one time.

Figure 4A:
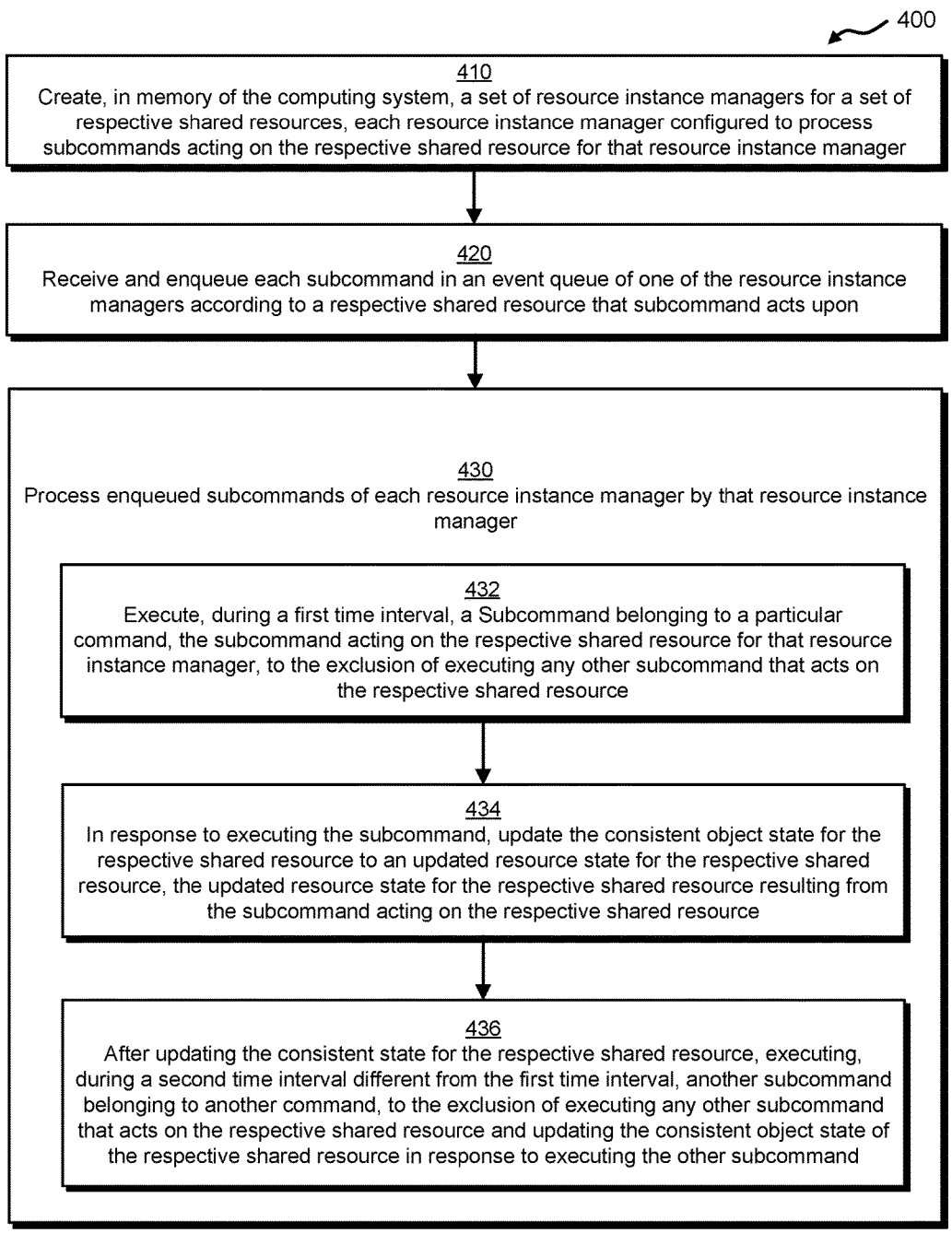
FIGS. 4A-4B are flowcharts of example processes for use in connection with various embodiments.

FIG. 4A shows an example process 400 used in some embodiments. The process 400 includes steps 410, 420, and 430 as well as substeps 432, 434, and 436. It should be understood that any time a piece of software (e.g., commands 170, subcommands 172, RIMs 150) is described as performing a method, process, step, or function, in actuality what is meant is that a computing device (e.g., computing system 100 or its component storage processor 120, etc.) on which that piece of software is running performs the method, process, step, or function when executing that piece of software on its processing circuitry 124. It should be understood that although depicted in one order, one or more steps or sub-steps may be combined together or performed in a different order. Dashed steps are ancillary or optional in some embodiments. Further, it should be understood that, in some embodiments, one or more of the steps may be omitted. Similarly, in some embodiments, one or more steps may be combined together or performed in a different order. It should be understood that although certain steps and related arrows are drawn separated from each other for clarity, various steps and associated events (corresponding to arrows) may overlap in time with each other.

At step 410, the processing circuitry 124 creates, in memory 130, a set of resource instance managers 150 for a set of respective shared resources 140. Each resource instance manager 150 is configured to process subcommands 172 acting on the respective shared resource 140 for that resource instance manager 150.

At step 420, processing circuitry 124 receives and enqueues each subcommand 172 in an event queue 154 of one of the resource instance managers 150 according to a respective shared resource 140 that subcommand 172 acts upon. For examples, refer to FIG. 2A and FIG. 3B At step 430, processing circuitry 124 processes enqueued subcommands 172 of each resource instance manager 150 by that resource instance manager 150 by successively performing substeps 432, 434, and 436.

At substep 432, processing circuitry 124 executes, during a first time interval (e.g., interval 302 in FIG. 3A), a subcommand 172 (e.g., 172P{1}) belonging to a particular command 170 (e.g., 170P), the subcommand 172 acting on the respective shared resource 140 (e.g., 140(1)) for that resource instance manager 150 (e.g., 150a), to the exclusion of executing any other subcommand 172 that acts on the respective shared resource 140. For instance, in the example of FIG. 3A, during interval 302, subcommand 172P{1} executes on resource 140(1) to the exclusion of any other subcommand 172 that acts on resource 140(1), such that, even though subcommand 172Q{1} is received by RIM 150a during interval 302, it does not execute during interval 302 while subcommand 172P{1} continues to operate on resource 140(1).

At substep 434, in response to executing the subcommand 172, processing circuitry 124 updates the consistent object state 142 (see, for example, FIGS. 2A and 2B) for the respective shared resource based on any modification of the shared resource 140 caused by execution of the subcommand 172.

At substep 436, after updating the consistent state 142 for the respective shared resource 140, the processing circuitry 124 executes, during a second time interval different from the first time interval, another subcommand 172 belonging to another command 170, to the exclusion of executing any other subcommand 172 that acts on the respective shared resource 140 and updates the consistent state 142 of the respective shared resource 140 in response to executing the other subcommand 172. For instance, in the example of FIG. 3A, during interval 304, subcommand 172Q{1} executes on resource 140(1) to the exclusion of any other subcommand 172 that acts on resource 140(1), such that, even though subcommand 172P{2} is received by RIM 150a during interval 304, it does not execute during interval 304 while subcommand 172Q{1} continues to operate on resource 140(1).

In some embodiments, RIMS 150 may be created only when needed, in response to subcommands 172 requiring access to specific shared resources 140. Similarly, RIMs 150 may be deleted (removed from memory 130) when no longer needed.

Figure 4B:
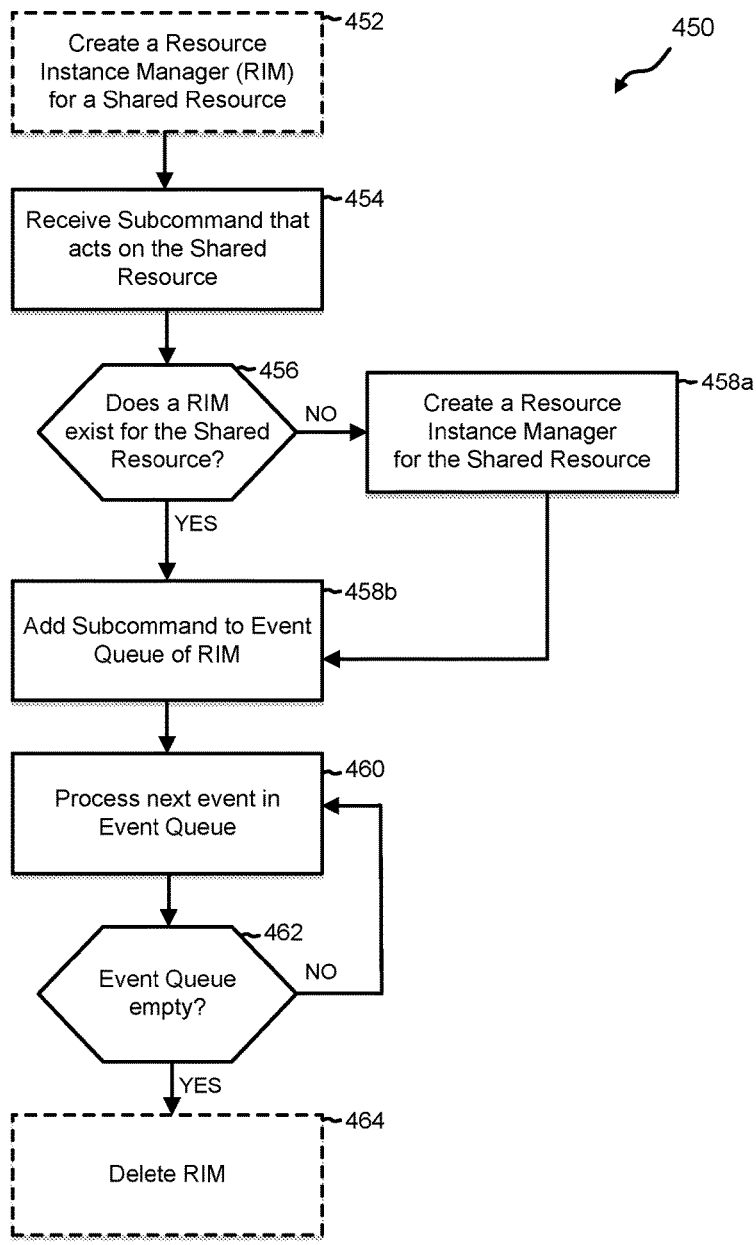

FIG. 4B shows a flowchart of a process 450 performed in some embodiments. Process 450 includes steps 452, 454, 456, 458a and 458b, 460, 462, and 464. It should be understood that some of these steps are optionally performed in some embodiments and not others. In addition, process 450 refers to a single shared resource 140 and an associated RIM 150. However, process 450 may be performed multiple times for additional shared resources 140.

At step 452, processing circuitry 124 optionally creates a RIM 150x to process a subcommand 172X{y} acting on particular shared resource 140(n), before receiving any subcommand 172 acting on shared resource 140(n). This is said to be optional because RIM 150x may have been created at some point in the past (and has remained available to processing circuitry 124). Step 452 is typically not performed immediately before step 454.

At step 454, processing circuitry 124 receives a subcommand 172X{y} which acts on shared resource 140(n). In step 456, in response to receiving the subcommand 172, processing circuitry 124 determines whether there is an existing RIM 150 (e.g., RIM 150z) in memory 130 assigned to handle the subcommands 172 acting on the particular shared resource 140(n). If there is no existing RIM 150 for resource 140(n), processing circuitry 124 proceeds to step 458a. Otherwise, processing circuitry 124 proceeds to step 458b.

At step 458a, in response to determining that there is no existing RIM 150 assigned to handle subcommand 172X{y} acting on the particular shared resource 140(n), processing circuitry 124 creates the appropriate RIM 150z in memory 130 and proceeds to step 458b. In some embodiments, steps 452 and/or 458a are part of step 410 of process 400 as depicted in FIG. 4A.

At step 458b, processing circuitry 124 causes the received subcommand 172X{y} to be added to the event queue 154x of RIM 150z. Afterward, processing circuitry 124 proceeds to step 460 and processes the next subcommand 172 in the event queue 154z of RIM 150z. In some embodiments, steps 454 and/or 458b are part of step 420 of process 400 as depicted in FIG. 4A At step 462, after processing a subcommand 172, processing circuitry 124 determines whether the event queue 154z of RIM 150z is empty. If the event queue 154z is empty, processing circuitry 124 may optionally delete RIM 150z from memory 130 at optional step 464 in some embodiments. In some embodiments, steps 460 and 462 are part of step 430 of process 400 as depicted in FIG. 4A State Machine Architecture In various embodiments, the commands 170 are implemented using a state-machine based modeling language, such as UML (Unified Modeling Language). As will be apparent from the forthcoming discussion of elements of the disclosure, implementing commands 170 in such a fashion enables various improvements disclosed herein.

Figure 5A:
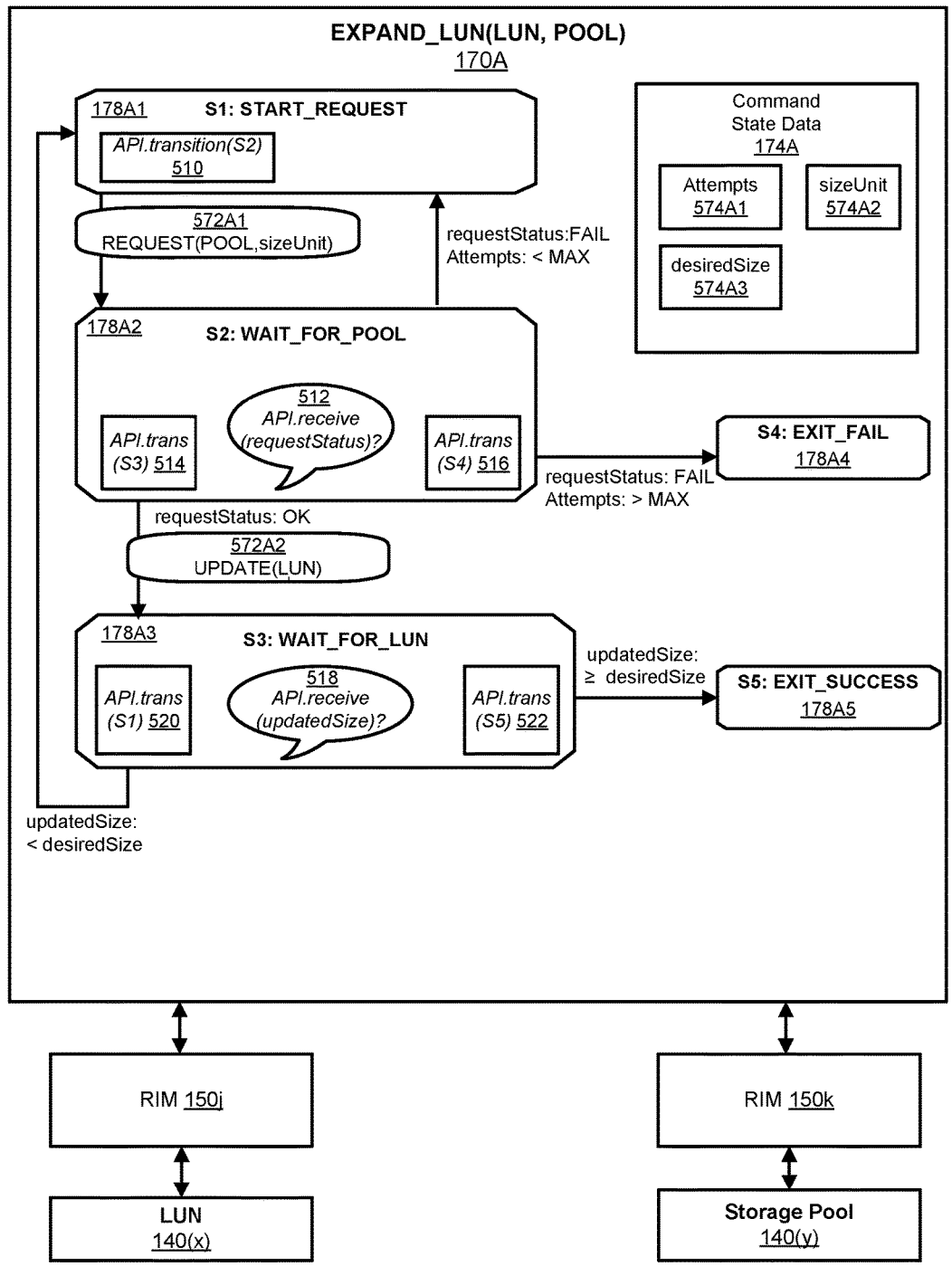
FIG. 5A is a block diagram of an example arrangement of data structures and apparatus for use in connection with various embodiments.

FIG. 5A shows an example command 170A ("EXPAND_LUN") used to increase the size of a LUN (or other virtual storage volume) managed by a computing system such as storage processor 120, for example. The EXPAND_LUN command 170A increases the size of LUN 140(x) by allocating additional storage to that LUN from a storage pool 140(y) of available extents of storage capacity. It should be understood that command 170A is a simplified example constructed for the purpose of illustrating concepts relating to the present disclosure. It should be further understood that the described functionality of command 170A may include additional complexity not disclosed herein for the sake of clarity of presentation and may also be implemented in many different ways in an actual computing system.

Features of commands 170 will now be discussed in the context of example command 170A. General statements about example command 170A and its components and features are meant to apply to commands 170 generally.

Example command 170A is constructed using a set of command states 178A, each of which has been given an identifier, as well as a descriptive name. The command states of command 170A are as follows: 'S1: START_REQUEST' (command state 178A1); 'S2: WAIT_FOR_POOL' (command state 178A2); 'S3: WAIT_FOR_LUN' (command state 178A3); 'S4: EXIT_FAIL' (command state 178A4); and 'S5: EXIT_SUCESS' (command state 178A5). Hereinafter, the command states 178A may be referred to by their shortened identifiers (e.g., 'S1', 'S2', etc.) for convenience.

In addition to the command states 178A, command 170A also stores command state data 174A. Command state data 174A may include such information as the current command state 178A of command 170A during execution, as well as internal variables specific to command 170A (e.g., 'Attempts' 574A1, 'sizeUnit' 574A2, and 'desiredSize' 574A3), which may be updated during execution of command 170A.

Each command state 178A of command 170A includes logic that determines how command 170A transitions (shown as arrows in FIG. 7A) from that specific command state 178A to one more of the other command states 178A. As part of its internal logic, command states 178A may send and receive events 176A (see, for example, FIGS. 2A-2B, FIGS. 3A-3B, and the accompanying descriptions for discussion of events 176). In some embodiments, sending and receiving events 176A, and transitioning between command states 178A, is accomplished by calling functions from application program interface ("API") 180 provided by the computing system (e.g., storage processor 120) in memory 130. Various command states 178A may respond to events 176A as part of their internal logic to determine how to transition other command states 178A, as will be discussed further after providing a functional description of command 170A.

Referring to FIG. 5A, command 170A begins in its initial command state 178A1, i.e., 'S1.' Command state 178A1 immediately transitions to another state by a function call 510 using API 190, API.transition (S2). Command state 'S1' specifies an instruction to be transmitted 572A1 as part of the transition from 'S1' to 'S2.' Instruction 572A1 is a REQUEST( ) function that requests an extent of storage from a particular shared resource 140, i.e., storage pool 140(y). The size of the extent is specified by variable 574A2 ('sizeUnit') which may be internal to command 170A or derived from a parameter passed to command 170A.

Once command 170A transitions to command state 178A2 ('S2') command 170A waits in 'S2' to receive an event 176A (not shown) corresponding to a result of the REQUEST( ) instruction issued during the transition to 'S2.' 'S2' uses a function call 512 to API 190, API.receive (requestStatus), to receive an event 176A (not shown) which specifies the outcome of the earlier REQUEST( ) instruction 574A1. If the REQUEST( ) instruction 572A1 failed and a maximum number of requests has been exceeded, command 170A transitions to 'S4: EXIT_FAIL.' Otherwise command 170A transitions to 'S1' to retry. 'Attempts' variable 574 is used to store the cumulative number of failures and is reset to zero upon a successful result.

If the instruction 574A1 is successful, command 170A transitions to 'S3.' As part of transitioning to 'S3', 'S2' issues an UPDATE( ) instruction 572A2 to update the LUN 140(x) to reflect the added storage allocation and transitions to either 'S1' or 'S5' depending on the result of a function call 518 using API 190, API.receive(updatedSize) which returns the new size of LUN 140(x).

If the function call 518 indicates the LUN 140(x) has reached a size corresponding to the internal desiredSize variable 574A3, 'S3' issues function call 522 using API 190, to transition to 'S5' corresponding to successful completion of command 170A. Otherwise 'S3' issues function call 520 using API 190, to transition to 'SP to request additional storage from storage pool 140(y).

Figure 5B:
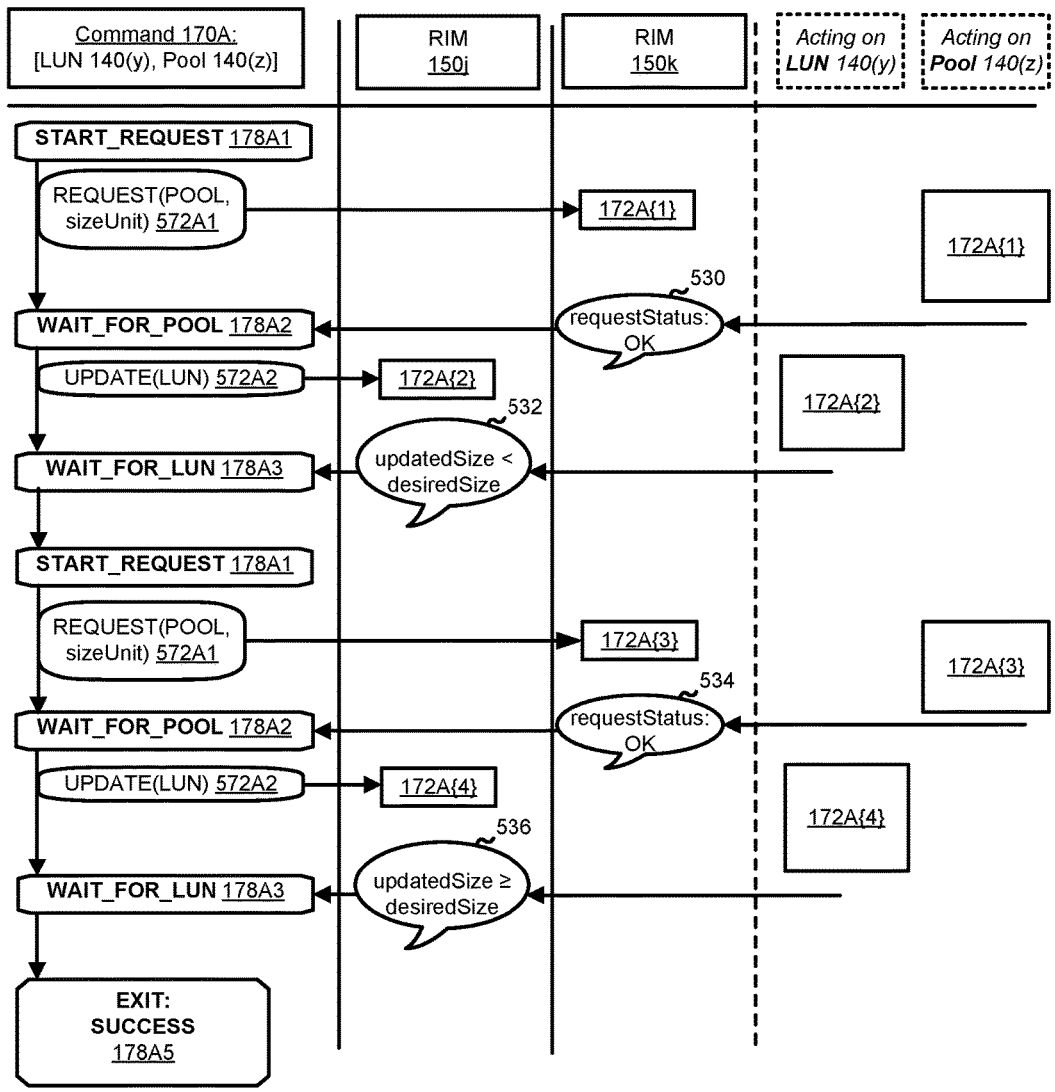
FIG. 5B shows an example sequence of operations corresponding to the example arrangement of data structures and apparatus for use in connection with various embodiments depicted in block diagram of FIG. 5A

FIG. 5B is a sequence diagram corresponding to an example scenario which includes execution of example command 170A. In this example scenario, command 170A expands LUN 140(y) by two extents of storage from storage pool 140(y).

First, command 170A transitions from command state 178A1 ('S1: START_REQUEST') to command state 178A2 ('S2: WAIT_FOR_POOL') and issues a REQUEST( ) instruction 572A1 during the transition which acts on storage pool 140(y) as previously described in connection with FIG. 5A. This instance of instruction 572A1 is received by RIM 150k and enqueued in event queue 154k (not shown individually) for execution as subcommand 172A{1}. Successful execution of subcommand 172A{1} results in an extent of storage being supplied from storage pool 140(y), modifying the object state 142(y) of storage pool 140(y). Event 530 indicating successful execution of subcommand 172A{1} is transmitted to command 170A, which is waiting in command state 178A2 ('S2: WAIT_FOR_POOL) for event 530.

After receiving event 530, command 170A transitions to command state 178A3 ('S3: WAIT_FOR_LUN') and issues an UPDATE( ) instruction 572A2 which acts on LUN 140(x) as previously described in connection with FIG. 5A. This instance of instruction 572A2 is received by RIM 150j and enqueued in event queue 152j (not shown) for execution as subcommand 172A{2}. Successful execution of subcommand 172A{2} results in the size of LUN 140(x) increasing, modifying the object state 142(x) of storage LUN 140(x). Event 532 indicating successful execution of subcommand 172A{2} is transmitted to command 170A, which is waiting in command state 178A3 ('S2: WAIT_FOR_LUN) for event 532.

Command 170A receives event 532 which indicates that the LUN 140(x) is still smaller than desired. Accordingly, command 170A transitions back to 'S1' in preparation for requesting additional storage from storage pool 140(y).

Upon entering 'S1' for a second time, command 170A again transitions to 'S2', issuing REQUEST( ) instruction 572A1 a second time as part of the transition. This second instance of instruction 572A1 is enqueued in event queue 152*k* of RIM 150*k* for execution as subcommand 172A{3}. Successful execution of subcommand 172A{3} results in a second extent of storage being supplied from storage pool 140(*y*), modifying the object state 142(*y*) of storage pool 140(*y*). Event 534 indicating successful execution of subcommand 172A{3} is transmitted to command 170A, which is waiting in command state 178A2 ('S2: WAIT_FOR_POOL) for event 534.

After receiving event 534, command 170A transitions to command state 178A3 ('S3: WAIT_FOR_LUN') a second time and again issues UPDATE( ) instruction 572A2 which acts on LUN 140(*x*). This second instance of instruction 572A2 is received by RIM 150*j* and enqueued in event queue 152*j* (not shown) for execution as subcommand 172A{4}. Successful execution of subcommand 172A{4} results in the size of LUN 140(*x*) increasing yet again, modifying the object state 142(*x*) of storage LUN 140(*x*) a second time. Event 536 indicating successful execution of subcommand 172A{4} is transmitted to command 170A, which is waiting in command state 178A3 ('S2: WAIT_FOR_LUN) for event 536.

Command 170A receives event 536 which indicates that the LUN 140(*x*) is now at least as large as desired. Accordingly, command 170A has successfully expanded the size of LUN 140(*x*). As a result, command 170A now transitions to 'S5: EXIT_SUCCESS', completing execution of command 170A.

Providing Automatic Fault Tolerance

Implementing commands 170 as described above in connection with FIG. 5A allows storage processor 120 (or any other computing system) to maintain a history of the evolution of commands 170 as they operate on resources 140 mediated by RIMs 150. This history can be stored in system history 190 to enable storage processor 120 to automatically recover from system failures events such as hardware failures, software crashes, or power losses, for example. Because execution of commands 170 mediated by RIMs 150 ensures that the object state data 142 of the resources 140 remains consistent, system state history 190 needs only store information related to commands which have not yet finished executing (i.e, command 170 in the midst of execution and commands 170 which are waiting to begin executing).

For example, processing circuitry 124 may record in system state history 190 each time an internal variable forming part of command state data 174 of a command 170 is modified. Processing circuitry 124 may also record each time a command 170 transitions between two of its internal command states 178 in system state history 190. With a sufficient record of the internal behavior of commands 170 during execution, storage processor 120 can resume commands 170 which have been interrupted, or alternatively, reverse changes to object states 142 of shared resources 140 caused by commands 170 which cannot be resumed and executed to completion as a result of a particular system failure. In some embodiments, system state history 190 is stored in a nonvolatile portion of memory 130 to allow the system to recover from a system failure event after a loss of system power.

If commands 170 of the storage processor 120 (or other computing system) are implemented using functions provided by API 180, the storage processor 120 may provide the fault tolerant features above transparently to users and developers implementing commands 170 as part of various applications running on storage processor 120.

For example, a user (or developer) may write a command 170 which specifies a set of command states 178, along with the associated logic for transitioning between the command states 178. Functions provided by the API 180 for effecting command state transitions and sending and receiving events may include routines which capture incoming and outgoing events 176 as well as command state transitions and store the data in system state history 190. If a developer uses the functions provided by API 180, the developer may benefit from automatic fault tolerance without needing to worry about designing commands 170 to enable this functionality.

Figure 6:
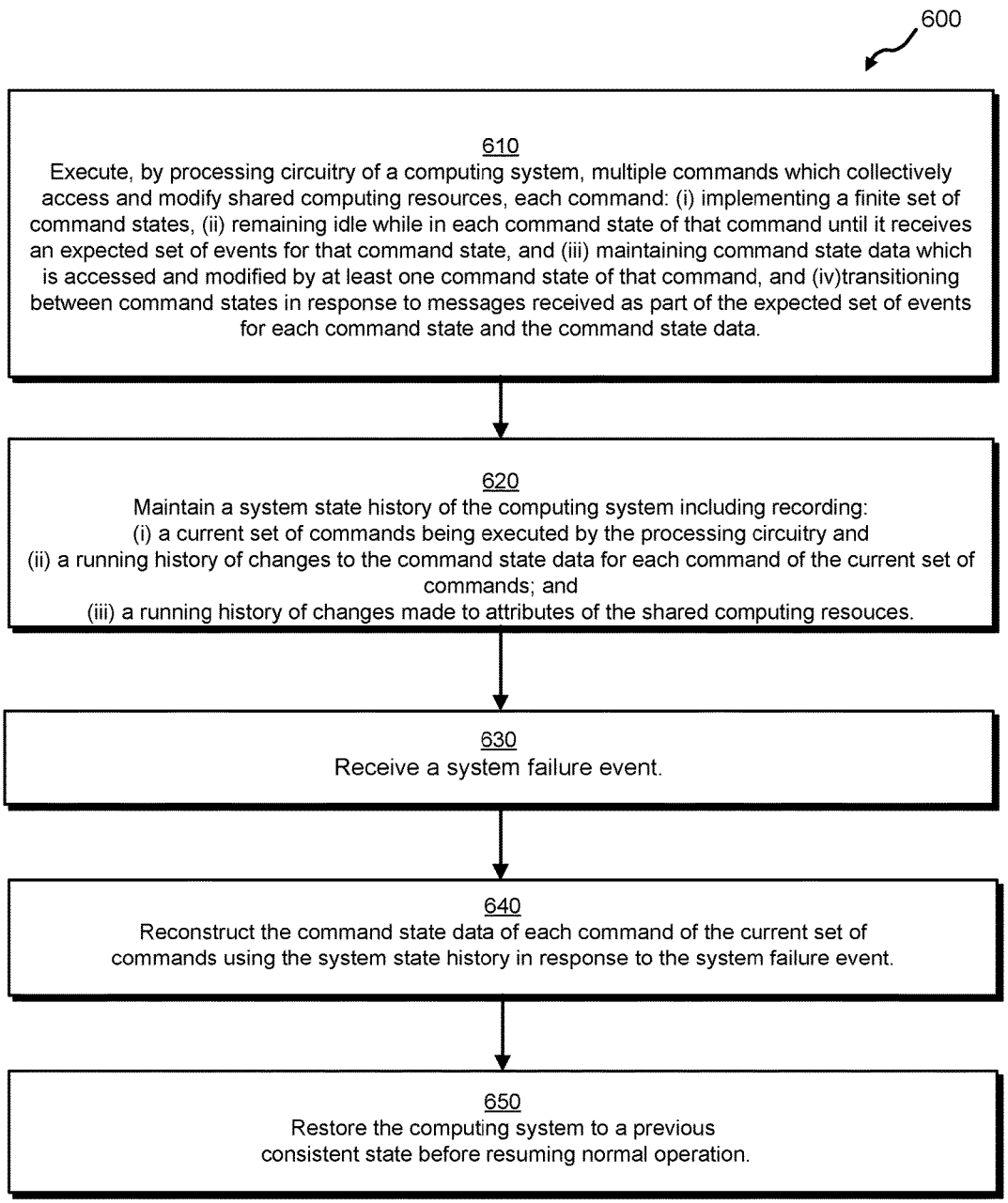
FIG. 6 is a flowchart of an example process for use in connection with various embodiments.

Along these lines, FIG. 6 is a flowchart of an example method 600 for providing automatic fault tolerance to commands 170 running on a computing system such as storage processor 120, for example. Example method 600 includes steps 610, 620, 630, 640, and 650.

At step 610 processing circuitry 124 executes commands of a set of commands 170 for managing shared resources of the computing system 120. Each command 170 implements a finite set of command states 178. Each command 170 remains idle while in each command state 178 of that command 170 until it receives an expected set of events 176 (see, for example, events 176P and 176Q in FIGS. 2A-2B, and events 530, 532, 534, and 536 of FIG. 5B and the accompanying description) for that command state 178. Each command 170 also maintains command state data 174 which is accessed and modified by at least one command state 178 of that command 170. For example, the internal 'Attempts' variable 574A1 of FIG. 5A is incremented or reset at various times during execution of command 170A by command state 178A2. Finally, each command 170 transitions between command states 178 of that command 170 based on the expected set of events for each command state 178 and the command state data 178 for that command 170.

At step 620, while commands 170 are being executed, the processing circuitry 124 maintains system state history 190 (typically in a nonvolatile portion of memory 130) by recording: (i) a current set of commands 170 being executed by the processing circuitry 124, (ii) a running history of changes to command state data 174 for each command 170 of the current set of commands 170, and (iii) a running of history in changes made to attributes of the resources 140 (i.e., changes to object state data 142).

At step 630, processing circuitry 124 receives a system failure event, such as notification that a hardware component has become inaccessible, notification of software crash, or a notification of a power interruption, for example.

At step 640, processing circuitry 124 reconstructs the command state data 174 of each command 170 of the current set of commands 170 using the system state history 190 in response to the system failure event. For instance, if a command 170 terminates while waiting in a state 178 for various events 176, the system state history 190 can be used to restore the values of internal variables 574 forming part of command state data 174.

Finally, at step 650, processing circuitry 124 restores the computing system to a previous consistent system state before resuming normal operation. This can be accomplished, at least in part by using the recovered command state data 174, the last known command state 178 of each command 170 which was operating at the time of the failure event and recovering events 176 which were sent to and/or received by commands 170 but which were not yet fully processed in a command state 178. As a further example, a command 170 may have been in command state 178 waiting for a set of three events 176, having only received two of those expected events 176. Storage processor 120 may use records in system state history 190 to restore the internal configuration of command 170 including a particular command state 178 having received two events 176 with particular messages, but not a third event 176 of the set of expected events for that command state 178.

Dynamic Command Scheduling

Further improvements can be realized by using RIMs 150 to control not only subcommands 172, but also execution of entire commands 170. For example, some commands 170 may be incompatible with other commands 170 if the system were to execute those commands 170 concurrently with each other. For instance, it might not make sense to process a command 170 involving writing data to a LUN or other resource 140 when another command 170 is in the process of deleting that LUN.

In some embodiments, RIMs 150 are configured to receive events 176 requesting execution of various commands 170. Upon an appropriate RIM 150x (not shown individually) receiving a command 170Z (as above, based on a resource 140 associated with the command 170), RIM 150x may use a set of predefined rules to determine how to handle the newly received command 170Z (not shown individually). The set of predefined rules may include default rules provided by the system as well as additional custom rules provided by a developer or user. RIM 150x processes the newly-received command 170Z based at least in part on whether command 170Z may run concurrently with other commands 170 currently in the command queue 152x of RIM 150x and/or commands 170 currently being executed RIM 150x, as specified by the predefined set of rules.

If the newly received command 170 may be run concurrently with the other commands 170, then RIM 150x enqueues subcommands 172Z of command 170Z in its event queue 154x along with subcommands 172 of the other commands 170, as previously described, particularly in connection with FIG. 2B.

As an example, the newly-received command 170Z may be incompatible with commands 170 previously enqueued in the event queue 152x of RIM 150x, or with commands 170 currently being executed by RIM 150x.

In this example, RIM 150x may reject the newly-received command 170Z and transmit an event 176 providing notice that the newly-received command 170Z has been aborted. Alternatively, the appropriate RIM 150x may accept the newly-received command 170Z and remove a previously enqueued command 170 from its command queue 152x instead. As yet another alternative, RIM 150 may accept the newly-received command 170Z but delay its execution until other commands 170 have executed.

In another example, a developer may wish to prioritize certain commands 170 over other commands 170. The above functionality can be achieved by using the command queues 152 of each RIM 150 to queue commands 170 for execution before enqueuing subcommands 172 of the commands 170 in the event queues 154 of the RIMs.

Figure 7A:
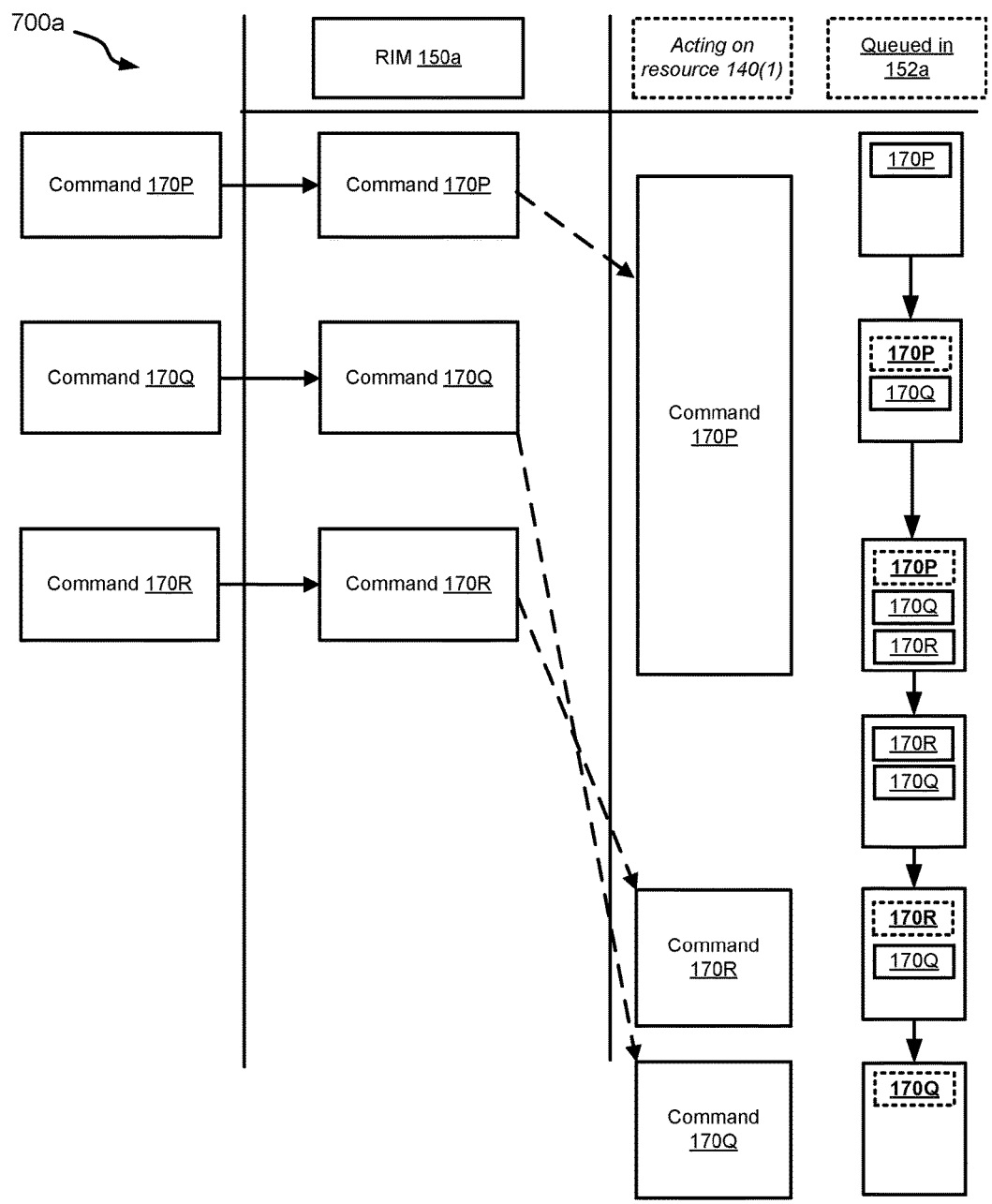
FIGS. 7A-7C show example sequences of operations for use in connection with various embodiments.

FIG. 7A shows an example sequence 700a of execution of three commands, 170P, 170Q, and 170R. The execution status of the commands 170P, 170Q, and 170R is indicated at the right of FIG. 7A, along with a representation of the status of command queue 152a at various times. Currently executing commands 170 are shown as still in command queue 152a for clarity, but are surrounded by a dashed border to distinguish them from commands 170 waiting in the command queue for execution to begin. In some embodiments, RIM 150a evaluates the set of predefined rules each time a request to execute a new command 170 is received and/or each time RIM 150a completes execution of a command 170 previously enqueued in command queue 152a.

In example sequence 700a, Command 170P which acts on resource 140(1) requests execution first and is enqueued in command queue 152a of RIM 150a. Command 170P may be executed immediately because no other commands 170 are in command queue 152a.

Next, while command 170P is acting on resource 140(1) (i.e., being executed by RIM 150a), RIM 150a receives a request to execute command 170Q. In this example, Command 170Q is not allowed to execute concurrently with command 170P (in contrast to sequences 300a and 300b of FIGS. 3A-3B wherein commands 170P and 170Q execute concurrently, although it is still the case that only one subcommand 172 is allowed to act on resource 140(1) at any given time). Accordingly, command 170Q is held in command queue 152a of RIM 150 while command 170P is executed.

After command 170Q is placed in command queue 152a, but before command 170P completes execution, RIM 150a receives a request to execute command 170R. In example sequence 700a, command 170R cannot be executed concurrently with command 170P. RIM 150a consults the set of predetermined rules which, in this example, specify that the command 170R is a higher priority for execution than command 170Q and reorders the commands 170 in the command queue 152a such that command 170R executes before command 170Q, even though command 170Q was enqueued in command queue 152 before command 170R.

Figure 7B:
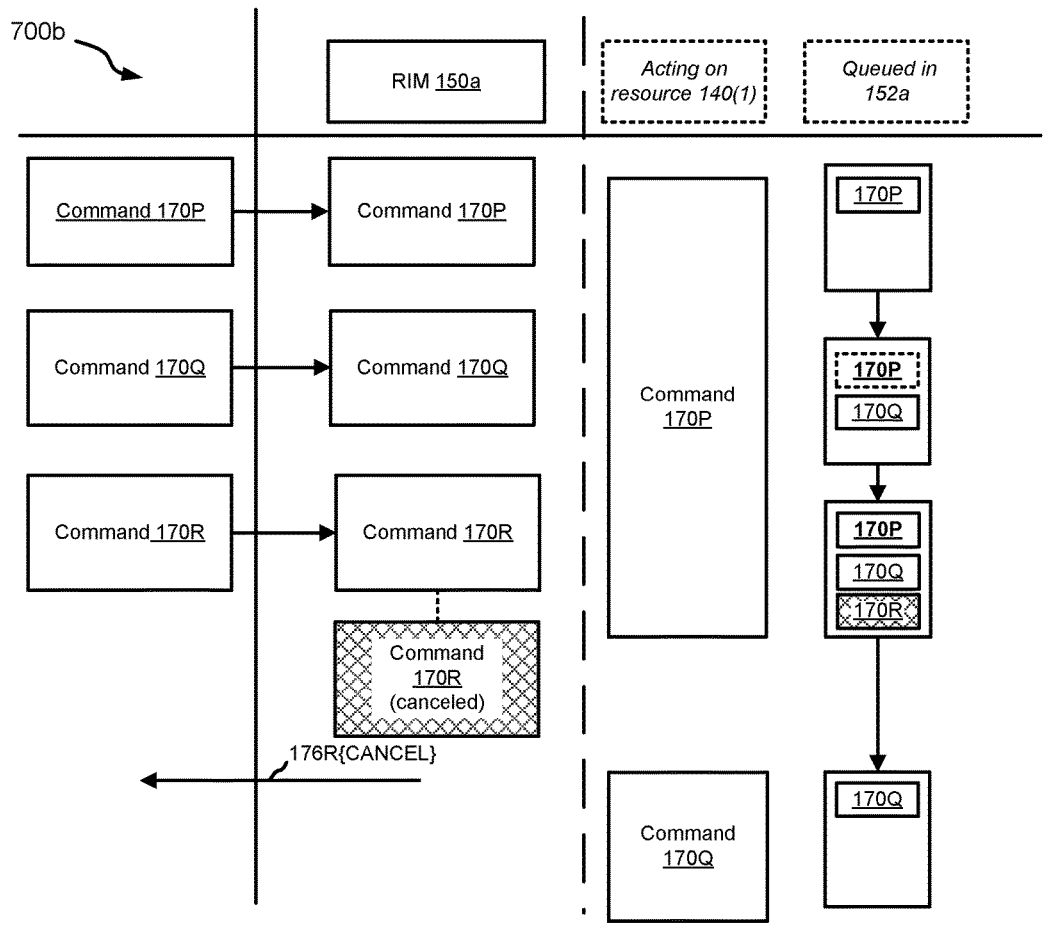

FIG. 7B shows another example sequence 700b. In example sequence 700b, RIM 150a receives a request to execute command 170P, followed by requests to execute command 170Q and command 170R. As in sequence 300a, command 170Q is enqueued in command queue 152a of RIM 150a and is prevented from executing until processing circuitry 124 completes execution of command 170P.

While command 170P is still executing, RIM 150a receives a request to execute command 170R. RIM 150a uses the set of predefined rules to determine, for example, that executing command 170R is incompatible with either (or both) of commands 170P and 170Q. Accordingly, RIM 150a does not add command 170R to command queue 152a for execution and sends event 176R{CANCEL} to cause command 170R to be aborted.

Figure 7C:
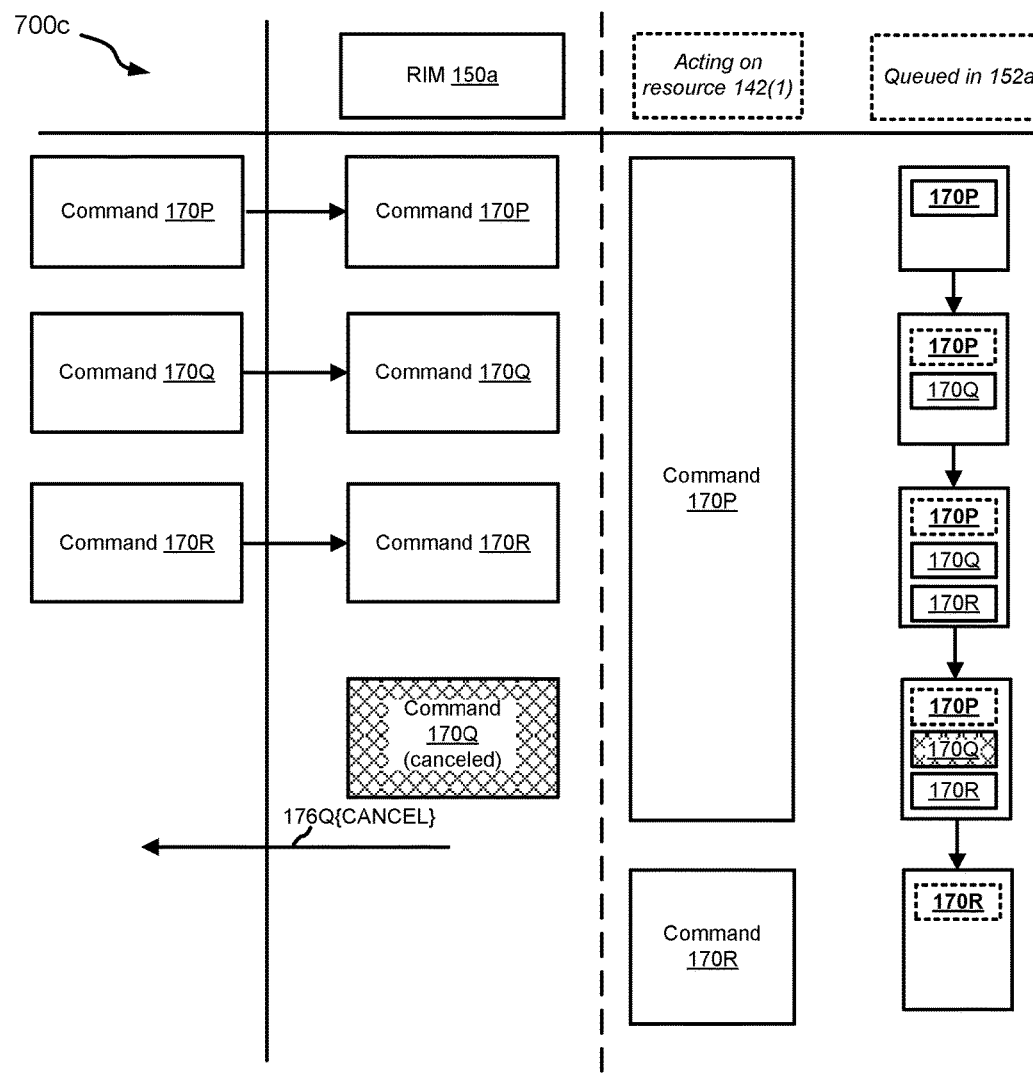

FIG. 7C shows yet another example sequence 700c. The sequence of execution requests for the commands 170P, 170Q, and 170R is the same as in sequence 700b. However, in example sequence 700c, the predefined rules differ with respect to commands 170Q and 170R. In example 700c, the command queue 152a is evaluated after receiving the request to execute command 170R and, in response to the request, RIM150a removes command 170Q from its command queue 152a and sends event 176Q{CANCEL} causing command 170Q to be aborted.

It should be understood that, in some embodiments, a command 170J (not shown individually) may require access to more than one shared resource 140. However, each subcommand 172J of command 170J acts upon only one of the set of resources 140, as discussed previously. As an example, a command 170J may initially be enqueued in command queue 152p of a first RIM 150p (not shown individually) which manages access to resource 140(n). However, once command 170J is allowed to execute by RIM 150p, it may issue a subcommand 172J which requests access to resource 140(m) (not shown individually), managed by RIM 150q (not shown individually). In response to receiving the request to access resource 140(m), RIM 150q will enqueue (or refuse to enqueue) that subcommand 172J in its command queue 152q. Accordingly, execution of any given command 170 is initially controlled by the first RIM 150 addressed by that command 170. However, a command 170 allowed to execute by the first RIM 150 addressed by that command 170 may subsequently have its execution further controlled by additional RIMs 150 if that command 170 issues subcommands 172 which collectively act upon multiple resources 140.

Figure 8:
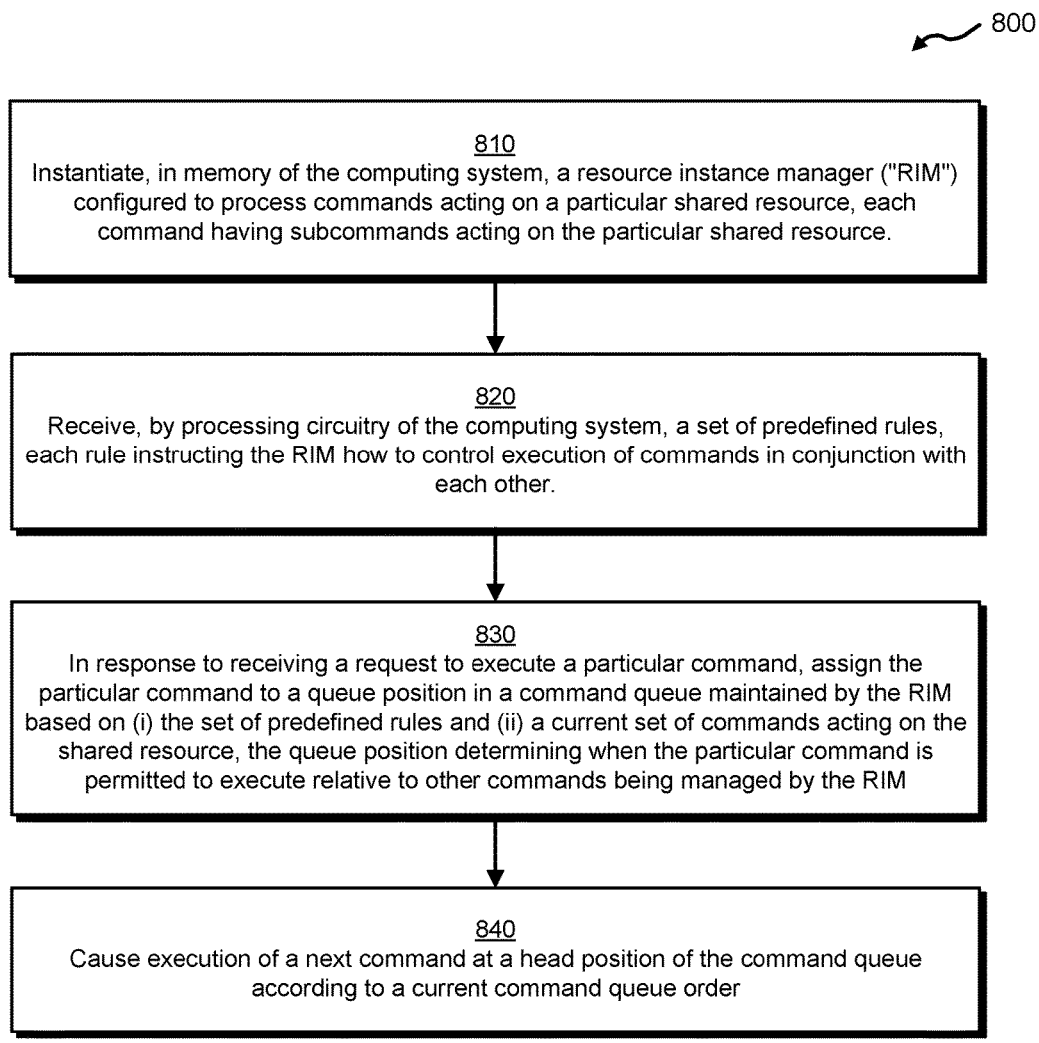
FIG. 8 is a flowchart of an example processes for use in connection with various embodiments.

FIG. 8 is a flowchart of an example method 800 of managing concurrent access to shared resources 140 in a computing system 120 while maintaining a consistent state 142 for each shared resource 140. Example method 800 includes steps 810, 820, 830, and 840.

At step 810, processing circuitry 124 instantiates a RIM 150e (not shown individually), in memory 130 of the computing system 120. The RIM 150e is configured to process commands 170 acting on a particular shared resource 140(p) (not shown individually), each command 170 having subcommands 172 acting on the particular shared resource 140(p).

At step 820 processing circuitry 124 receives a set of predefined rules, each rule instructing the RIM 150e how to control execution of commands 170 in conjunction with each other. By way of example, if resource 140(p) is a LUN in a data storage system, then the set of predefined rules may specify that certain data storage operations carried out by commands 170 may operate concurrently on LUN objects without risk of producing inconsistencies in the object state 142(p) of resource 140(p). However, some commands 170 may be incompatible with concurrent access to a LUN such as LUN 140(p). As an example, the set of predefined rules may specify that a command 170 that writes data to LUN 140(p) will not be permitted to execute if another command 170 that will delete that LUN 140(p) is in process.

At step 830, in response to receiving a request to execute particular command 170U (not shown individually), processing circuitry 124 assigns the particular command 170U to a queue position in a command queue 152e maintained by RIM 150e. RIM 150e determines an appropriate queue position for command 170U based on (i) the set of predefined rules and (ii) a current set of commands acting on the shared resource 140(p). The queue position of a command 170 determines when that command 170 is permitted to execute relative to other commands 170 being managed by the same RIM 150. For example, when the command queue 152 of a RIM 150 is empty, a newly-received command 170 is placed at the head of the command queue 152. Commands 170 at the head position of a command queue 152 (such as command queue 152e above) are permitted to begin execution and transmit their subcommands 172 to the event queues 154 of the RIMs 150, as previously described.

Finally, at step 840, processing circuitry 124 causes execution of a next command 170 at the head position of command queue 152e according to a current command queue order for command queue 152e.

Thus, techniques for managing access to a set of shared computing resources 140 in a computing system 100 include representing resources 140 as objects and managing access to those objects using a set of resource instance managers 150 have been presented. The resource instance managers 150 respond to all commands 170 requesting access to the set of respective shared resources 140. Access to each shared resource 140 is managed by a unique resource instance manager 150 for that resource 140. When the commands 170 are processed by a set of resource instance managers 150 as disclosed herein, multiple processes may execute in parallel without causing deadlocks and or introducing data corruption. Each resource instance manager 150 receives subcommands 172 of the various commands 170 and enqueues them in an event queue 154. Each resource instance manager 150 then allows one subcommand 172 to run at a time, while maintaining a consistent state 142 for the shared resource 140 corresponding to that resource instance manager 150. When execution of a subcommand 170 modifies the state 142 of the shared resource 140, the resource instance manager 150 communicates changes in that state 142 to next subcommand 172 in the event queue 154 before allowing that subcommand 172 to be executed. The disclosed techniques include embodiments which also provide automatic fault tolerance through an API 180 which facilitates transparently maintaining a system state history 190.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method of preventing command processing deadlocks and maintaining a consistent object state for each of a set of shared computing resource objects (hereinafter "shared resources") in a computing system which executes a set of commands having subcommands for managing the shared resources, the method comprising:
    creating, in memory of the computing system, a set of resource instance managers for a set of respective shared resources, each resource instance manager configured to process subcommands acting on the respective shared resource for that resource instance manager;
    receiving and enqueuing each subcommand in an event queue of one of the resource instance managers according to a respective shared resource that subcommand acts upon; and
    processing enqueued subcommands of each resource instance manager by that resource instance manager:
        executing, during a first time interval, a subcommand belonging to a particular command, the subcommand acting on the respective shared resource for that resource instance manager, to the exclusion of executing any other subcommand that acts on the respective shared resource;
        in response to executing the subcommand, updating the consistent object state for the respective shared resource to an updated resource state for the respective shared resource, the updated resource state for the respective shared resource resulting from the subcommand acting on the respective shared resource; and
        after updating the consistent object state for the respective shared resource, executing, during a second time interval different from the first time interval, another subcommand belonging to another command, to the exclusion of executing any other subcommand that acts on the respective shared resource and updating the consistent state of the respective shared resource in response to executing the other subcommand.

2. A method as in claim 1,
    wherein each command of the set of commands is implemented as a finite set of command states,
    wherein each command of the set of commands is idle while in each command state of that command until it receives an expected set of events for that command state;
    wherein, after receiving the expected set of events for that command state, the command (a) transmits a subcommand which is allowed to act on a certain shared resource of the set of shared resources and no other shared resource and (b) transitions to a next command state of the command;
    wherein the expected set of events for the next command state includes a set of messages indicating an execution status of each of the set of subcommands.

3. A method as in claim 2, wherein the method further includes selecting the next command state from one of multiple candidate command states based on a content of each message of the set of messages.

4. A method as in claim 2, wherein the method further includes, for a particular command, after transitioning to the next command state of the particular command, transmitting a subcommand that (i) acts on a different shared resource and (ii) is allowed to act on only the different shared resource.

5. A method as in claim 1, wherein at least one of the commands includes multiple subcommands.

6. A method as in claim 1, wherein the method further includes, after detecting that an event queue of a particular resource instance manager is empty, removing that resource instance manager from the memory of the computing system.

7. A method as in claim 1, wherein creating the set of resource instance managers for the set of respective shared resources includes creating at least one of the set of resource instance managers in response to: (a) receiving a subcommand that acts on one of the set of shared resources (b) making a determination that no resource instance manager exists in memory of the computing system for that shared resource.

8. A computer program product comprising a non-transitory computer-readable storage medium storing instructions which, when executed by processing circuitry of a computing system, cause the processing circuitry to manage a set of commands having subcommands for managing shared computing resource objects (hereinafter "shared resources") by:
    creating, in memory of the computing system, a set of resource instance managers for a set of respective shared resources, each resource instance manager configured to process subcommands acting on a respective shared resource for that resource instance manager;
    receiving and enqueuing each subcommand in an event queue of one of the resource instance managers according to a respective shared resource that subcommand acts upon; and
    processing enqueued subcommands of each resource instance manager by that resource instance manager:
        executing, during a first time interval, a subcommand belonging to a particular command, the subcommand acting on the respective shared resource for that resource instance manager, to the exclusion of executing any other subcommand that acts on the respective shared resource;
        in response to executing the subcommand, updating the consistent object state for the respective shared resource to an updated resource state for the respective shared resource, the updated resource state for the respective shared resource resulting from the subcommand acting on the respective shared resource; and
        after updating the consistent object state for the respective shared resource, executing, during a second time interval different from the first time interval, another subcommand belonging to another command, to the exclusion of executing any other subcommand that acts on the respective shared resource and updating the consistent state of the respective shared resource in response to executing the other subcommand.

9. A computer program product as in claim 8, wherein the instructions, when executed by the processing circuitry of the computing system, further cause the processing circuitry to, after detecting that an event queue of a particular resource instance manager is empty, remove that resource instance manager from the memory of the computing system.

10. A computer program product as in claim 8, wherein creating the set of resource instance managers for the set of respective shared resources includes creating at least one of the set of resource instance managers in response to: (a)

receiving a subcommand that acts on one of the set of shared resources (b) making a determination that no resource instance manager exists in memory of the computing system for that shared resource.

11. A computing system for preventing command processing deadlocks and maintaining a consistent object state for each of a set of shared computing resource objects (hereinafter "shared resources") while executing a set of commands having subcommands for managing the shared resources, the system comprising processing circuitry coupled to memory configured to:

create, in the memory, a set of resource instance managers for a set of respective shared resources, each resource instance manager configured to process subcommands acting on the respective shared resource for that resource instance manager;

receive and enqueue each subcommand in an event queue of one of the resource instance managers according to a respective shared resource that subcommand acts upon; and process enqueued subcommands of each resource instance manager, each resource instance manager configured, while processing the enqueued subcommands for that resource instance manager, to:

execute, during a first time interval, a subcommand belonging to a particular command, the subcommand acting on the respective shared resource for that resource instance manager, to the exclusion of executing any other subcommand that acts on the respective shared resource;

in response to executing the subcommand, update the consistent object state for the respective shared resource to an updated resource state for the respective shared resource, the updated resource state for the respective shared resource resulting from the subcommand acting on the respective shared resource; and after updating the consistent object state for the respective shared resource, execute, during a second time interval different from the first time interval, another subcommand belonging to another command, to the exclusion of executing any other subcommand that acts on the respective shared resource and updating the consistent state of the respective shared resource in response to executing the other subcommand.

12. A computing system as in claim 11, wherein each command of the set of commands is implemented as a finite set of command states, wherein each command of the set of commands is idle while in each command state of that command until it receives an expected set of events for that command state;

wherein, after receiving the expected set of events for that command state, the command (a) transmits a subcommand which is allowed to act on a certain shared resource of the set of shared resources and no other shared resource and (b) transitions to a next command state of the command;

wherein the expected set of events for the next command state includes a set of messages indicating an execution status of each of the set of subcommands.

13. A computing system as in claim 12, wherein the processing circuitry coupled to the memory is further configured to select the next command state of each command from one of multiple candidate command states for that command based on a content of each message of the set of messages.

14. A computing system as in claim 12, wherein the processing circuitry coupled to the memory is further configured to, for a particular command, after transitioning to the next command state of the particular command, cause the particular command to transmit a subcommand that (i) acts on a different shared resource and (ii) is allowed to act on only the different shared resource.

15. A computing system as in claim 11, wherein at least one of the commands includes multiple subcommands.

16. A computing system as in claim 11, wherein the processing circuitry coupled to the memory is further configured, after detecting that an event queue of a particular resource instance manager is empty, to remove that resource instance manager from the memory.

17. A computing system as in claim 11, wherein creating the set of resource instance managers for the set of respective shared resources includes creating at least one of the set of resource instance managers in response to: (a) receiving a subcommand that acts on one of the set of shared resources (b) making a determination that no resource instance manager exists in memory of the computing system for that shared resource.

* * * * *